United States Patent [19]

Sawada

[11] Patent Number: 4,961,185
[45] Date of Patent: Oct. 2, 1990

[54] METHOD FOR CONTROLLING A TERMINAL EQUIPMENT COUPLED TO AN INTEGRATED SERVICES DIGITAL NETWORK AND A TERMINAL EQUIPMENT BASED ON THE SAME

[75] Inventor: Mitsuji Sawada, Tama, Japan

[73] Assignee: Ricoh Company, Ltd., Tokyo, Japan

[21] Appl. No.: 376,624

[22] Filed: Jul. 7, 1989

[30] Foreign Application Priority Data

Jul. 11, 1988 [JP] Japan .................. 63-170809

[51] Int. Cl.⁵ .............................................. H04N 1/00
[52] U.S. Cl. ................................... 370/79; 370/110.1;
379/100; 358/442
[58] Field of Search ...................... 370/110.1, 79, 58.1,
370/60.1, 60; 358/434-436, 442; 379/93, 94,
100, 96

[56] References Cited

U.S. PATENT DOCUMENTS

| | | | |
|---|---|---|---|
| 4,689,789 | 8/1987 | Herger | 370/110.1 |
| 4,746,986 | 5/1988 | Tanigawa | 379/100 |
| 4,792,800 | 12/1988 | Fujioka et al. | 370/110.1 |

FOREIGN PATENT DOCUMENTS

| | | | |
|---|---|---|---|
| 0291307 | 11/1988 | European Pat. Off. | 379/100 |
| -3721047 | 1/1988 | Fed. Rep. of Germany | 379/100 |
| 0274866 | 11/1987 | Japan . | |
| 0026068 | 2/1988 | Japan . | |
| 0148750 | 6/1988 | Japan . | 379/100 |

OTHER PUBLICATIONS ntz, vol. 37 (1984), No. 9, pp. 578–586.
CCITT, Sixth Plenary Assembly, Orange Book, vol. VII, Geneva, pp. 175–203.

Primary Examiner—Douglas W. Olms
Assistant Examiner—Alpus H. Hsu
Attorney, Agent, or Firm—Oblon, Spivak, McClelland, Maier & Neustadt

[57] ABSTRACT

A terminal equipment and a method for controlling a subject terminal equipment coupled to an ISDN. First, it is discerned whether a message supplied from the ISDN is received. Next, each time the message is received, it is determined whether the message includes information on whether a different terminal to be communicated with by the subject terminal is a terminal coupled to either an ISDN or an analog network. Then, it is checked whether the different terminal is a terminal coupled to the ISDN or an analog network by referring to the information included in the message. When the different terminal is determined to be a terminal coupled to the ISDN, a group 4 facsimile transmission protocol is selected and executed. On the other hand, when the other different terminal is determined to be a terminal coupled to the analog network, a group 3 facsimile transmission protocol is selected and exectuted.

22 Claims, 9 Drawing Sheets

FIG. 5A

| PROTOCOL IDENTIFIER |
| --- |
| CALL NUMBER |
| MESSAGE TYPE |
| INDISPENSABLE INFORMATION ELEMENT |
| ADDITIONAL INFORMATION ELEMENT |

FIG. 5B

| TRANSMISSION ABILITY |
| --- |
| PROGRESS IDENTIFIER |
| CALL NUMBER |
| DESTINATION NUMBER |
| LOW-LEVEL LAYER MATCHING |
| HIGH-LEVEL LAYER MATCHING |

FIG. 5C

| CHANNEL IDENTIFIER |
| --- |
| PROGRESS IDENTIFIER |

FIG. 5D

| PROGRESS IDENTIFIER |
| --- |

FIG. 5E

| REASON INDICATION |
| --- |
| DISPLAY |

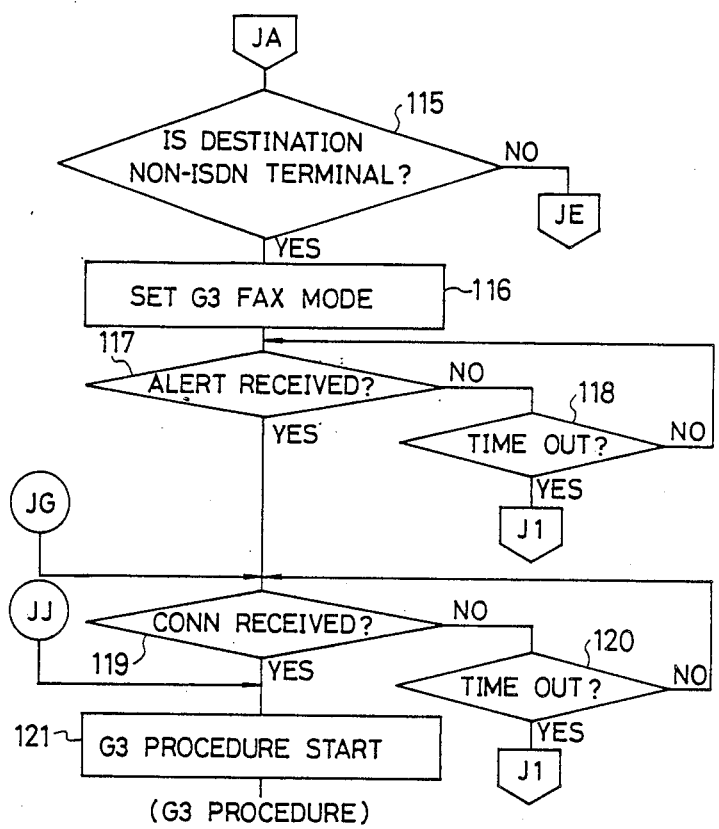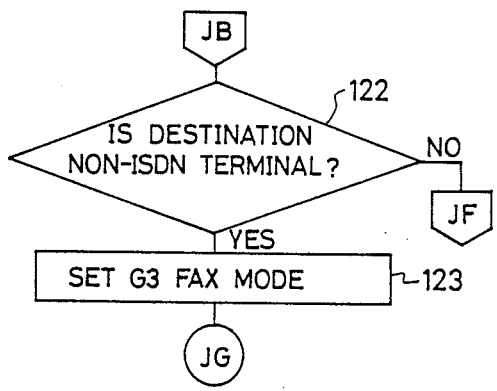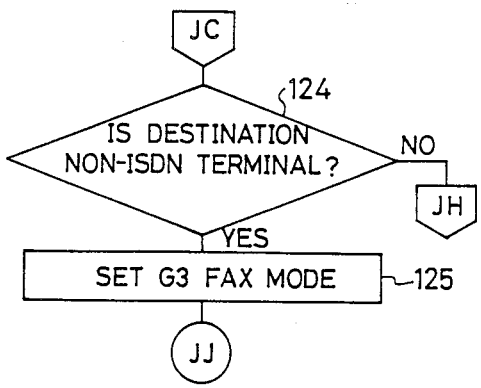

METHOD FOR CONTROLLING A TERMINAL EQUIPMENT COUPLED TO AN INTEGRATED SERVICES DIGITAL NETWORK AND A TERMINAL EQUIPMENT BASED ON THE SAME

BACKGROUND OF THE INVENTION

The present invention generally relates to a method for controlling a terminal equipment coupled to an integrated services digital network and a terminal equipment based on the same.

Recently, there has been considerable activity in the development of an integrated services digital network (hereinafter simply referred to as an ISDN). Currently, data terminal equipments for exchanging data with an ISDN have been put to practical use. An ISDN will take place of a public services telephone network (hereinafter simply referred to as a PSTN) in the feature. However, both ISDN and PSTN will be used until the ISDN is completely substituted for the PSTN. In order to construct a network including both the ISDN and PSTN, internetworking has been proposed, which enables it to be possible to exchange data between the ISDN and PSTN.

In the above-mentioned circumstance, a group 4 facsimile machine which uses an ISDN as a transmission line is required to exchange data with a group 3 facsimile machine which uses a PSTN as a transmission line. In order to meet this requirement, it is necessary to determine, prior to starting a transmission control procedure for image information transmission, as to whether a destination terminal is a group 4 facsimile machine coupled to an ISDN or a group 3 facsimile machine coupled to a PSTN.

SUMMARY OF THE INVENTION

It is therefore a general object of the present invention to meet the above-mentioned requirement.

A more specific object of the present invention is to provide a method for controlling an ISDN terminal which can communicate with a terminal coupled to a PSTN, and an ISDN terminal equipment based on the method.

The above objects of the present invention can be achieved a method for controlling a terminal equipment coupled to an intergrated services digital network (ISDN), comprising the steps of discerning whether a message supplied from the ISDN is received, the message being used at the time of setting up a call; determining, each time the message is received, as to whether the message includes information on whether the other terminal equipment to communicate with each other is a terminal coupled to either an ISDN or an analog network other than the ISDN, the analog network being coupled to the ISDN; determining whether the other terminal equipment is a terminal coupled to the ISDN or an analog network other than the ISDN by referring to the information included in the message; executing a first communication control suitable for exchanging data with the other terminal equipment through the ISDN, when the other terminal equipment is determined to be a terminal coupled to the ISDN by referring to the information included in the message; and executing a second communication control suitable for exchanging data with the other terminal equipment through the ISDN and the analog network connected thereto, when the other terminal equipment is determined to be a terminal coupled to the analog network other than the ISDN by referring to the information included in the message.

The above-mentioned objects of the present invention can also be achieved by a terminal equipment coupled to an integrated services digital network (ISDN) handling data in digital form, comprising ISDN interface means, coupled to the ISDN, for executing a transmission control procedure related to up to layer 3 of an ISDN structured architecture; discerning means for discerning whether a message supplied from the ISDN is received through the ISDN interface means, the message being used at the time of setting up a call; first determining means, coupled to the discerning means, for determining, each time the message is received, as to whether the message includes information on whether the other terminal equipment to communicate with each other is a terminal coupled to either an ISDN or an analog network other than the ISDN, the analog network being coupled to the ISDN; second determining means, coupled to the first determining means, for determining whether the other terminal equipment is a terminal coupled to the ISDN or the analog network other than the ISDN; first control means, coupled to the second determining means, for executing a first communication control suitable for exchanging data with the other terminal equipment through the ISDN, when the other terminal equipment is determined to be a terminal coupled to the ISDN by referring to the information included in the message; second control means, coupled to the second determining means, for executing a second communication control suitable for exchanging data with the other terminal equipment through the ISDN and the analog network connected thereto, when the other terminal equipment is determined to be a terminal coupled to the analog network other than the ISDN by referring to the information included in the message; and switching means for selectively connecting one of the first control means and second control means to the ISDN interface means, the switching means being controlled based on the determination result in the second determining means.

Other objects, features and advantages of the present invention will become apparent from the following detained description when read in conjunction with the accompanying drawings.

BRIEF DESCRIPTION OF THE DRAWINGS

FIG. 5A is a view illustrating a basic structure of a message related to the layer 3;

FIG. 5B is a view illustrating a call set-up message information element;

FIG. 5C is a view illustrating a call set-up accepted message information element;

FIG. 5D is a view illustrating a call message or an answer message;

FIG. 5E is a view illustrating a disconnection message or a release message;

FIGS. 6A through 6D are flowcharts of a procedure executed at the time of setting up a call;

DESCRIPTION OF THE PREFERRED EMBODIMENTS

Figure 1:
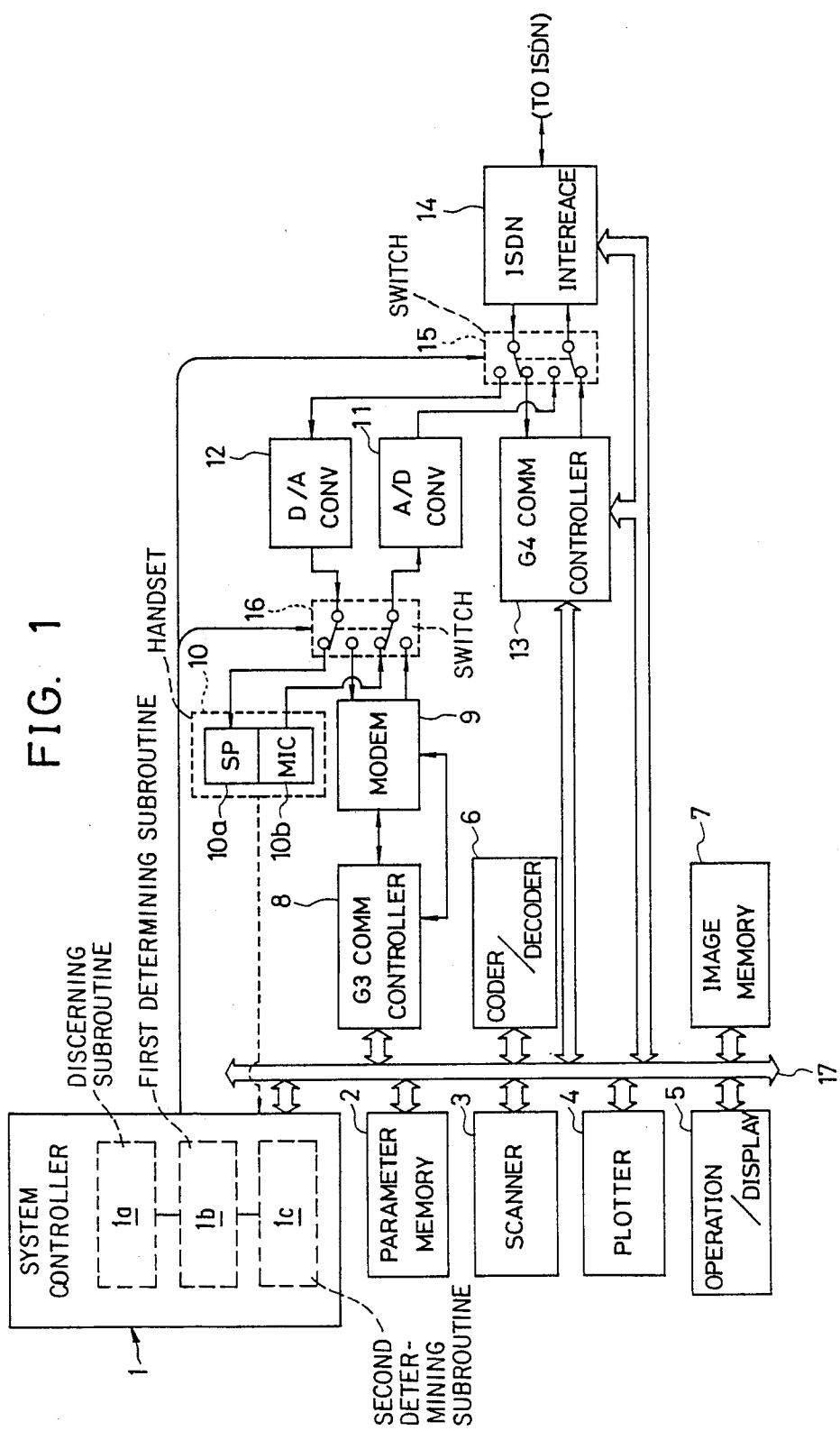
FIG. 1 is a block diagram of a preferred embodiment of the present invention.

A description is given of a facsimile machine of a first preferred embodiment of the present invention. FIG. 1 is a block diagram of the first embodiment of the present invention. The illustrated facsimile machine has a group 4 facsimile function, a group 3 facsimile function, and a telephone set function.

A system controller 1 controls the entire facsimile machine. A parameter memory 2 stores a variety of information inherent in the illustrated facsimile machine, such as abbreviated dialing and fee information. A scanner 3 reads a transmission document with a predetermined resolution level. A plotter 4 prints an image with a predetermined resolution level. An operation/-display unit 5 is used for inputting data and displaying a message, for example. A coder/decoder (CODEC) 6 compresses an image signal by coding, and expands a compressed image signal by decoding so as to generate the original image signal. The coder/decoder 6 has not only an encoding function suitable for a group 3 facsimile machine but also an encoding function suitable for a group 4 facsimile machine. An image memory 7 is used for storing the compressed image data. A communication controller 8 for a group 3 facsimile machine is used for controlling a transmission procedure relating to a group 3 facsimile machine. Hereinafter, the communication controller 8 is referred to as a G3 communication controller. A modem (modulator/demodulator) 9 has the function of modulating and demodulating digital data. A handset 10 is made up of a receiver (speaker) 10a and a transmitter (microphone) 10b.

An analog-to-digital converter (hereinafter simply referred to as an A/D converter) 11 converts an analog signal supplied from the modem 9 or the microphone 10b to a digital signal. An ISDN to which the illustrated facsimile machine is coupled, processes a signal in digital form. A digital-to-analog converter (hereinafter simply referred to as a D/A converter )12 converts a digital signal supplied from the ISDN into an analog signal. A communication controller 13 suitable for a group 4 facsimile machine is used for controlling a transmission procedure relating to a group 4 facsimile machine. Hereinafter, the communication controller 11 is referred to as a G4 communication controller. An ISDN interface circuit 14 provides an ISDN line control related to up to layer 3. As is well known, a layer structure consisting of 7 layers, or an ISDN structured architecture is recommended by CCITT (Comite Consultif International Telegraphique et Telephonique). Layer 1 is a physical layer, later 2 is a data link layer, and layer 3 is a network layer. Layer 4 is a transport layer, layer 5 is a session layer, layer 6 is a presentation layer, and layer 7 is an application layer.

A switch 15 connects a terminal side connection part of the ISDN interface circuit 14 to any one of the A/D converter 11, the D/A converter 12 and the G4 communication controller 13. A switch 16 connects an analog side connection part of each of the A/D converter 11 and the D/A converter 12 to either the modem 9 or the handset 10.

The system controller 1, parameter memory 2, scanner 3, plotter 4, operation/display unit 5, coder/decoder 6, image memory 7, G3 communication controller 8 and G4 communication controller 13 mutually exchange data through a system bus 17. The ISDN interface circuit 14 exchanges a variety of information with the system controller 1 and the G4 communication controller 13. Normally, the switch 15 selects the G4 communication controller 13, and is switched so as to select the A/D converter 11 and the D/A converter 12 when a destination terminal is determined to be a G3 facsimile machine. Thereby, the transmission mode of the facsimile machine is switched from the group 4 facsimile mode to the group 3 facsimile mode, or the speech mode in which the handset 10 is used.

On the other hand, normally, the switch 16 selects the handset 10. When an operator takes off the handset 10, a hook switch (not shown) provided in the handset 10 is switched to the offhook state. A signal indicative of the state of the hook switch is applied to the system controller 1 through a signal line indicated by a broken line. When the handset 10 is switched to the offhook state, the system controller 1 controls the facsimile machine so as to operate in the speech mode. In the speech mode, the switch 15 is controlled so as to select the A/D converter 11 and D/A converter 12. On the other hand, when the system controller 1 activates the G3 communication controller 8 in order to provide the facsimile function, the system controller 1 controls the switch 16 so as to select the modem 9.

Figure 2:
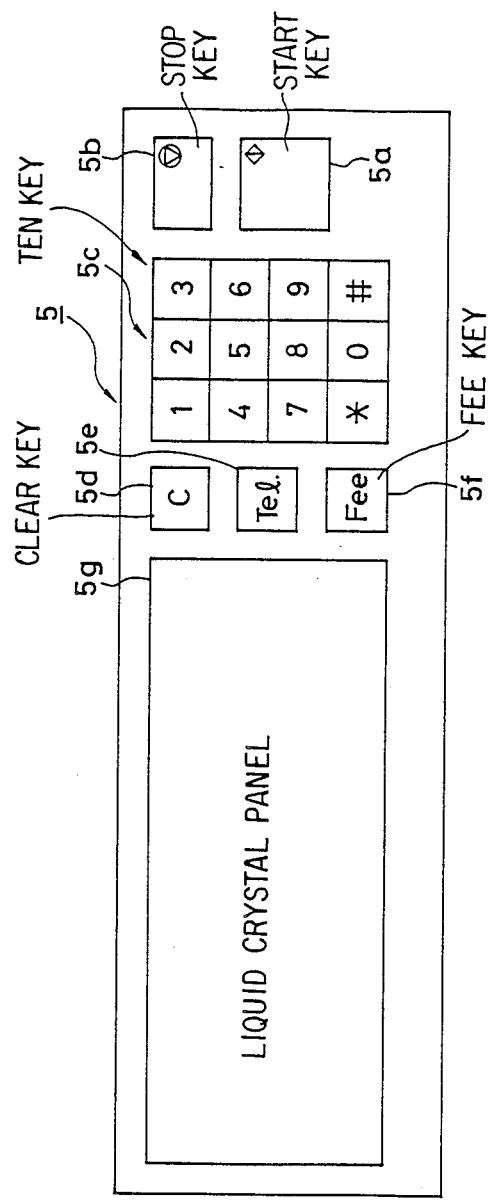
FIG. 2 is a plan view of an operation/display unit used in the embodiment.

Referring to FIG. 2, there is illustrated the operation/display unit 5, which has the following structural elements. A start key 5a is used for starting a transmission operation and reception operation of the facsimile machine. A stop key 5b is used for stopping the operation of the facsimile machine. A ten key 5c is used for inputting numeric information such as a telephone number and abbreviated dialing information. The ten key 5c has a plurality of modes such as a telephone number input mode, a numeric data input mode and a date input mode. A clear key 5d is used for cancelling input information. A telephone key 5e sets the input mode of the ten key 5a to the telephone number input mode. A fee key 5f is used for instructing the start of fee displaying. A liquid crystal pannel 5g is used for displaying a variety of information on an operation guidance message to the operator supplied from the facsimile machine, and the fee.

Figure 3A:
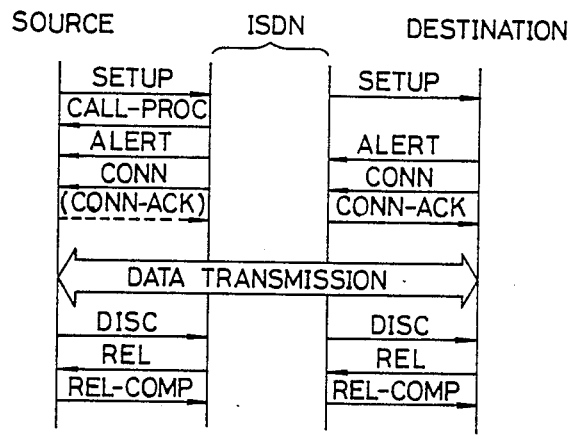
FIG. 3 is a view illustrating a transmission procedure in an ISDN.
FIG. 3B is a view illustrating another transmission procedure.
Figure 3B:
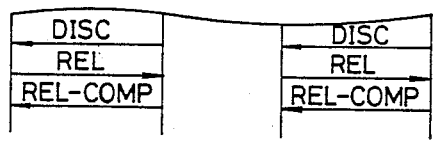

A description is given of a basic data transfer procedure of an ISDN terminal equipment with reference to FIGS. 3A and 3B. Referring to FIG. 3A, a source terminal sends an ISDN a call set-up message SETUP in order to request a call set-up to a destination terminal. Then the ISDN sends the designated destination terminal the call set-up message SETUP in order to call out the destination terminal. Further, the ISDN sends the source terminal a call set-up accepted message CALL PROC in order to let the source terminal know the call set-up state.

When the destination terminal detects the arrival of the call set-up message SETUP, the destination terminal sends the ISDN a call message ALERT which lets the source terminal know the start of ringing. When destination terminal answers the call, it sends the ISDN an answer message or connection message CONN. Correspondingly, the ISDN sends the source terminal the answer message CONN to thereby let the source terminal know that the destination terminal accepts the call.

The ISDN sends the destination terminal an answer confirmation message or a connection acknowledgement CONN ACK. At this time, an information channel for data transfer is established between the source and destination terminals. Thereby, the source and destination terminals are allowed to communicate with each other. After that, data transfer is carried out between the source and destination terminals in accordance with respective transfer control procedures. For example, data transfer based on the group 4 facsimile transfer control procedure is executed.

When the data transfer is completed, the source terminal sends the ISDN a disconnection message DISC in order to request a release of the information channel. The ISDN sends the destination terminal the disconnection message DISC for letting the destination terminal know a release of the information channel. Thereby, the destination terminal sends back the ISDN a release message REL for letting the source terminal know that the channel disconnection is completed. The ISDN sends the source terminal the release message REL.

When the channel release is completed, the source terminal sends the ISDN a release completion message REL COMP. Then, the ISDN sends the destination terminal the release completion message REL COMP, and then the release of the information channel is completed. Hence, the information channel established between the source and destination terminals is completely released from the connection state, and the line returns to the idle state.

In this manner, the information channel is established between the source and destination terminals, and is then released from the connection state. Alternatively, it is possible for the destination terminal to send the disconnect message DISC to thereby request a release of the information channel from the connection state. In this case, messages illustrated in FIG. 3B are sent.

The ISDN has the release message REL to be sent to the source terminal include a fee information, when the information channel is released from the used state and the disconnect message DISC has been sent from the source terminal. Alternatively, when the disconnect message DISC is output from the destination terminal, the ISDN has the release message REL to the sent to the source terminal include a fee information.

Figure 4:
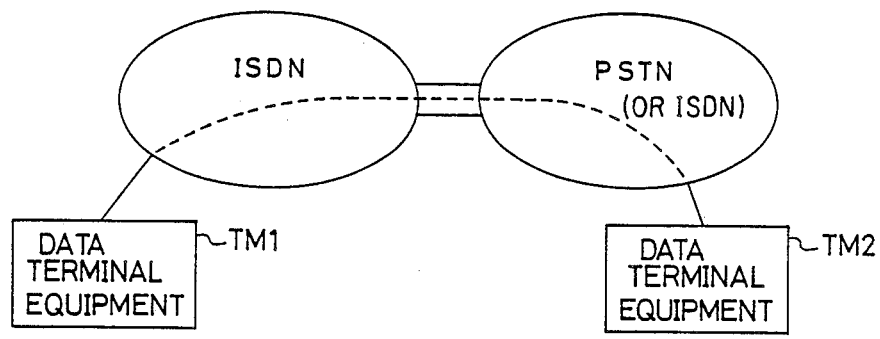
FIG. 4 is a view illustrating internetworking between an ISDN and a PSTN.

Now, as shown in FIG. 4, a destination terminal TM2 can be coupled to an ISDN by either a PSTN or, as shown in parenthesis, by an ISDN. If a destination terminal TM2 which is coupled to an ISDN and designated by a source terminal TMI at the time of setting up a call, is a data terminal equipment coupled to a PSTN, the ISDN calls the designated destination terminal TM2 by using an internetworking function. Thereby, an information channel is established between the source terminal TMI coupled to the ISDN and the destination terminal TM2 coupled to the PSTN. In this case, if the functions of the source and destination terminals TMI and TM2 coincide with each other, they can communicate with each other. At this time, the ISDN lets the source terminal TMI coupled to the ISDN know that the destination terminal is a non-ISDN terminal by adding a progress identifier to various messages used for setting up a call, that is, the call set-up accepted message CALL PROC, call message ALERT, answer message CONN, and progress indication message PROG.

The above-mentioned messages in conformity to the layer 3 are described below. As shown in FIG. 5A, each message consists of a protocol identifier, a call number, a message type, an indispensable information message, and an additional information message. The protocol identifier is used for specifying the protocol specification (format and sequence) which defines layer 3 call control messages. The call number is used for specifying a call related to the present message. The message type indicates the contents of the message. The indispensable information message is added to each message without exception. The additional information message is added to each message at need.

As shown in FIG. 5B, the call set-up message SETUP has a transmission ability as an indispensable information element, and has, as additional information elements, a progress identifier, a source number, a destination number, low-level layer matching, and high-level layer matching.

As shown in FIG. 5C, the call set-up accepted message CALL PROC includes the channel identifier and the progress identifier, as additional information elements. As shown in FIG. 5D, each of the call message CALL and the answer message CONN includes the progress identifier, as an additional element. The progress indication message PROG has the progress identifier as an indispensable information element, and a reason indication as an additional information element. As shown in FIG. 5E, each of the disconnect message DISC and the release message REL includes the reason indication as an indispensable element, and an indication as an additional information element.

The contents of the information elements are described below. The transmission ability defines an information transfer ability, a transfer mode, an information transfer style, and information indicative of a protocol of user's information. The information element of information transfer ability represents the contents of the information to be transmitted, by selecting any from among an audio, non-limited digital information, limited digital information, 3.1 kHz audio, 7 kHz audio, and video. The transfer mode indicates whether the exchange to be used for data transfer is a line exchange or a packet exchange. The source number represents the telephone number (ISDN address) of the source terminal, and the destination number represents the telephone number of the destination terminal.

The information element of the progress identifier indicates an event which occurs during the time when a call is generated, such that a call is not an ISDN end-to-end, the destination terminal is a non-ISDN terminal, or the source terminal is a non-ISDN terminal.

The source number information element indicates an ISDN address (number) of the source terminal, and the destination number information element indicates the ISDN address of the destination terminal. The low-level layer matching information element is used for checking whether or not it is possible to communicate with the destination terminal, and basically has the same contents as the information element related to the transmission ability. Additionally, some detailed information may be included in the low-level layer matching information element. The high-level layer matching information element is used for checking whether the source terminal matches the destination terminal, and indicates an available terminal function such as a G2/G3 facsimile function, a G4 facsimile function, a mixed mode function, a teletex function, a videotex function, a telex function, and a message handling system function.

The channel identifier information element is used for specifying a channel or sub-channel used in the basic interface of an ISDN. The reason indication information element is used for describing the reason why a message is generated, a diagnosis message used when there is an error in the procedure, and a source which generates the reason. The display information element is used for displaying information required to be displayed on a terminal, such as fee information.

It is noted that the source terminal knows that the destination terminal is coupled to a network rather than an ISDN, such as a PSTN, from the contents of the progress identifier, when this progress identifier is included in at least one of the call set-up accepted message CALL PROC, the call message ALERT, and the response message CONN, all of which are sent from the ISDN, and/or when the progress identifier is included in the progress indication message PROG. The source terminal determines that a destination terminal is coupled to a network, such as PSTN, rather than an ISDN, by performing various subroutines as shown in FIG. 6A–6D, for example. In making this determination, as schematically shown in FIG. 1, the system controller 1 performs a discerning subroutine 1a for discerning whether a message supplied from the ISDN is received through the ISDN interface, the message being used at the time of setting up a call. Then, a first determining subroutine is performed for determining each time the message is received, whether or not the message includes information on whether a different terminal equipment to which the terminal equipment communicates with is a terminal coupled to an ISDN or and analog network other than an ISDN, the analog network being coupled to the ISDN. Thereafter, as shown schematically in FIG. 1, the system controller 1 performs a second determining subroutine, 1c, for determining whether the different terminal equipment is a terminal coupled to the ISDN or an analog network other than the ISDN.

On the other hand, the source terminal knows that the source terminal is coupled to a network rather than an ISDN, a PSTN, for example, from the contents of the progress identifier, when this progress identifier is included in the call set-up message SETUP supplied from the ISDN, and when the progress indication message PROG.

Further, when the call set-up message SETUP includes the low-level layer matching information element and the high-level layer matching information element, the destination terminal can discern whether the source terminal has the same function as itself from the contents of the above matching information elements. Therefore, the destination terminal can determine whether the call from the source terminal should be accepted or not from the results.

In the above-mentioned manner, the source and destination terminal can knows the available functions of the respective other terminals, prior to starting data transfer.

A description is given of an operation of the facsimile machine shown in FIG. 1 with reference to FIGS. 6A through 6D, which relate to the procedure of selecting the transmission function to be used.

Figure 6A:
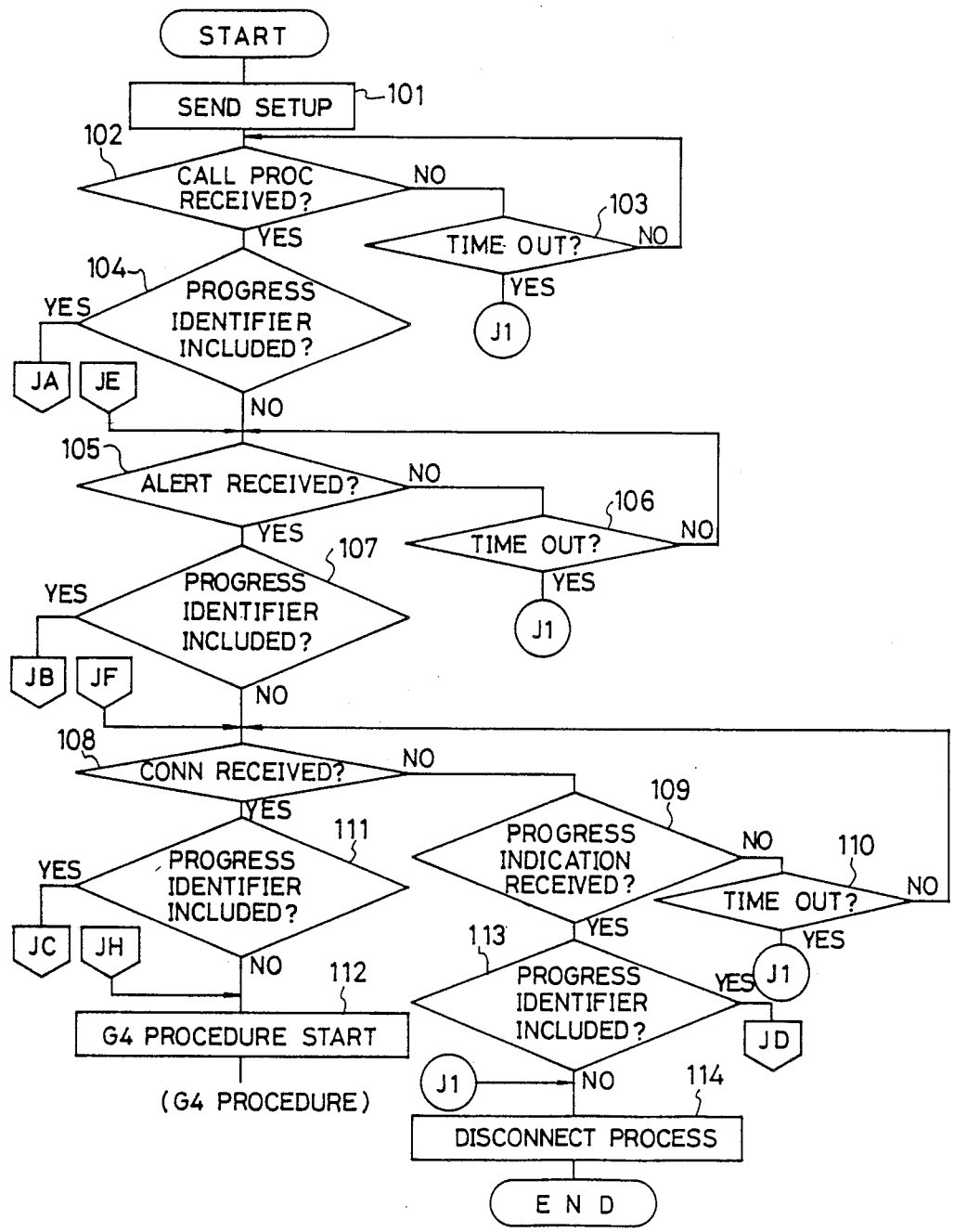

Referring to FIG. 6A, the system controller controls the ISDN interface circuit 14 so as to send an ISDN the call set-up message SETUP (step 101). Then the system controller 1 checks whether the call set-up accepted message CALL PROC is received from the ISDN within a predetermined fixed time (a NO loop related to steps 102 and 103). When the call set-up accepted message CALL PROC is received and therefore the result in step 102 becomes YES, the system controller 1 of the source terminal discerns whether or not the received call set-up accepted message CALL PROC includes the progress identifier information element (step 104). When the progress identifier information element is not included in the call set-up accepted message CALL PROC and therefore the result in step 104 is NO, the system controller 1 of the source terminal checks whether the call message ALERT is received from the ISDN within a predetermined fixed time (a NO loop related to steps 105 and 106). When the call message is received and therefore the result in step 105 becomes YES, the system controller 1 of the source terminal determines whether the received call message ALERT includes the progress identifier information element (step 107). When the result in step 107 is NO, the system controller 1 checks whether the answer message CONN or the progress indication message PROG is received within a predetermined fixed time from the reception of the call message ALERT (a NO loop related to steps 108, 109 and 110).

When the answer message CONN is received and therefore the result in step 108 is YES, the system controller 1 of the source terminal discerns whether or not the received answer message CONN includes the progress identifier information element (step 111). When the result in step 111 is NO, the destination terminal is an ISDN terminal and therefore, the system controller 1 instructs the G4 communication controller 13 to start the group G4 facsimile transmission control procedure (step 112). When the progress indication message PROG is received and the result in step 109 is YES, the system controller 1 discerns whether the received progress message PROG includes the progress identifier information element (step 113). When the result in step 113 is NO, an error occurs in the contents of the received progress indication message PROG. For this reason, the system controller 1 instructs the ISDN interface circuit 14 to release the information channel from the used state (step 114).

When the progress identifier information element is included in the call set-up accepted message CALL PROC and the result in step 104 is YES, the system controller 1 of the source terminal discerns whether the contents of the progress identifier information element indicate that the destination terminal is an non-limited ISDN terminal (step 115 of FIG. 6B). When the result in step 115 is NO, the procedure proceeds to step 105.

When the result in step 115 is yes, the system controller 1 sets the facsimile machine to the group 3 facsimile mode (step 116). At this time, the system controller 1 instructs the switch 15 to select the A/D converter 11 and the D/A converter 12 so that they are connected to the ISDN interface circuit 14. Further, the system controller 1 instructs the switch 16 to the modem 9 so that the A/D converter 11 and D/A converter 12 are switched so as to be connected to the modem 9 from the handset 10.

After executing step 116, the system controller 1 discerns whether the call message ALERT is received within a predetermined fixed time (a NO loop related to steps 117 and 118). When the result in step 117 is YES, the system controller discerns whether the answer message CONN is received within a predetermined fixed time from the lapse of the predetermined fixed time set in the NO loop related to steps 117 and 118 (a NO loop related to steps 119 and 120). When the result in step 119 is YES, the system controller 1 activates the G3 communication controller 8 so as to start the group 3 facsimile transmission control procedure (step 121).

When the result in step 107 is YES, the system controller 1 of the source terminal determines whether the contents of the progress identifier information element indicate that the destination terminal is an non-ISDN terminal (step 122 of FIG. 6C). When the result in step 122 is NO, the procedure proceeds to step 108. Alternatively, when the result in step 122 is YES, the system controller 1 sets the facsimile machine to the group 3 facsimile mode as in the same way as in step 116 (step 123). Thereafter, the procedure proceeds to step 119 shown in FIG. 6B.

When the result in step 111 is YES, the system controller 1 discerns whether the contents of the progress identifier information element indicate that the destination terminal is a non-ISDN terminal (step 124 of FIG. 6D). When the result in step 124 is YES, the system controller 1 sets the facsimile machine to the group 3 facsimile mode as in the same way as in step 116 (step 125). Then the procedure proceeds to step 121.

During the time when the source terminal waits for any message, if a time out occurs and therefore any one of the results in step 103, 106, 110, 118 and 120 becomes YES, the system controller 1 executes the in step 114 and stops the information transfer.

In the above-mentioned manner, the source terminal is switched to the group 3 facsimile mode when the the received call set-up message SETUP includes the progress identifier information element, and the contents thereof indicate that the destination terminal is an non-ISDN terminal.

Figure 7A:
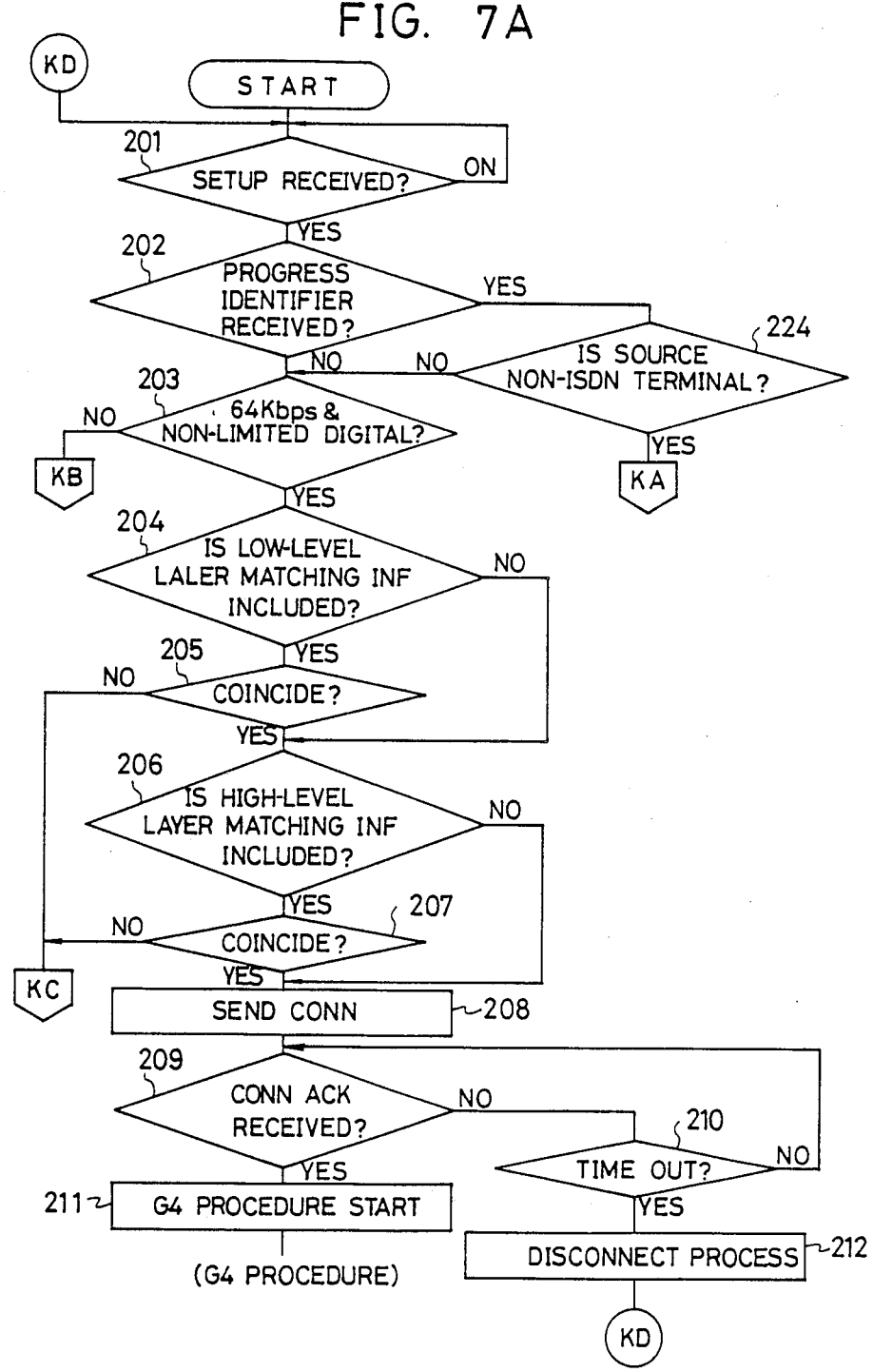
FIGS. 7A and 7B are flowcharts of a procedure executing at the time of the arrival of a call.
Figure 7B:
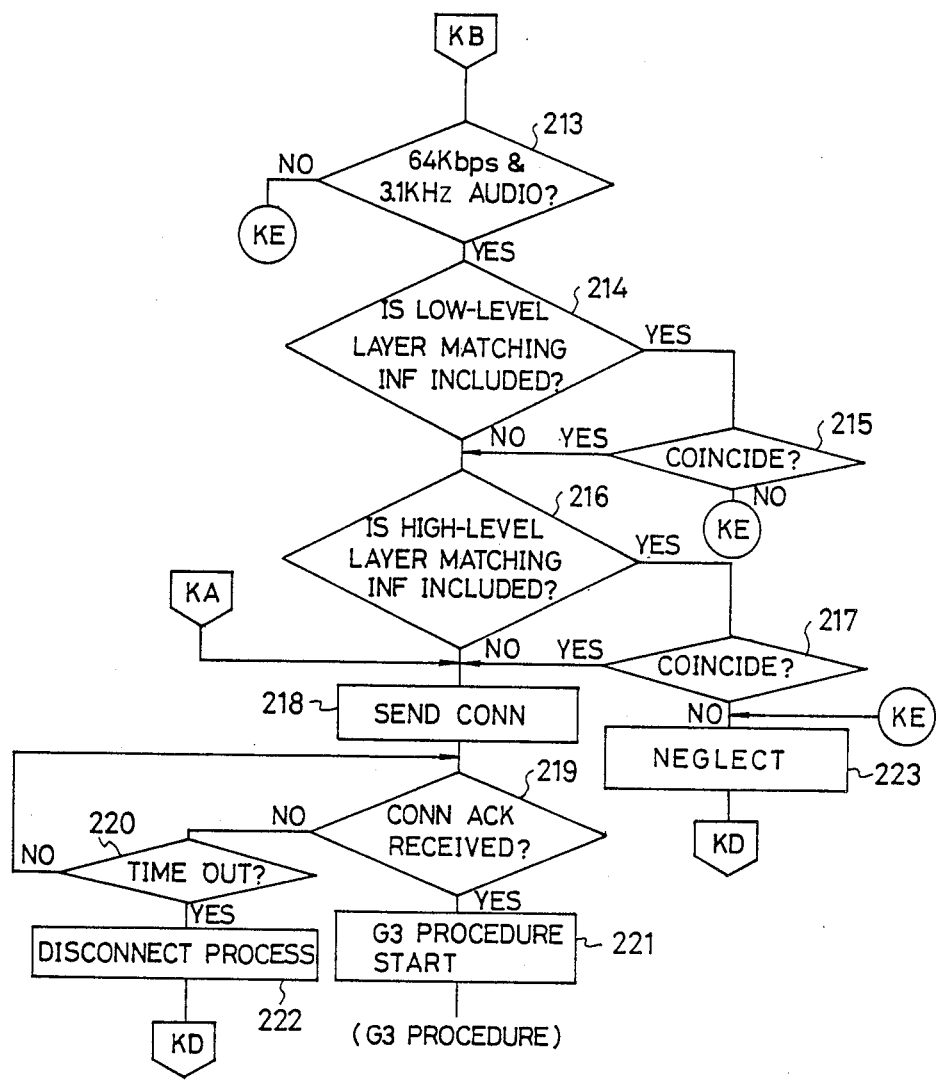

A description is given of an operation which is done when a call is received, with reference to FIGS. 7A and 7B.

Referring to FIG. 7A, the system controller 1 waits for the reception of the call set-up message SETUP from the ISDN (a NO loop related to step 201). When the call set-up message SETUP is received and therefore the result in step 201 becomes YES, the system controller 1 of the destination terminal discerns whether the progress identifier information element is included in the received call set-up message SETUP (step 202). When the result in step 202 is NO, the system controller 1 checks whether the information transfer ability defined in the received call set-up message SETUP indicates a non-limited digital signal with a bit rate of 64 kbps (step 203). When the result in step 203 is YES, the system controller 1 determines whether the low-level layer matching information element is included in the received call set-up message SETUP (step 204). Then the result in step 204 is YES, the contents of the low-level layer matching information element coincide with those of the own low-level layer matching information stored in the parameter memory 2 (step 205). When the result in step 205 is YES, the system controller 1 checks whether the high-level layer matching information element is included in the received call set-up message SETUP (step 206). When the result in step 206 is YES, the system controller 1 discerns whether the contents of the included high-level layer matching information element coincide with those of the own high-level layer matching information stored in the parameter memory 2 (step 207). When the result in step 207 is YES, the system controller 1 instructs the ISDN interface circuit 14 to send the ISDN the answer message CONN (step 208). After completing the send of the answer message CONN, the system controller 1 monitors the reception of the answer confirmation message CONN ACK within a predetermined fixed time (a NO loop related to steps 209 and 210).

When the result in step 209 is YES, the system controller 1 instructs the G4 communication controller 13 to start the group 4 facsimile transmission control procedure (step 211). On the other hand, when the result in step 209 is negative, the system controller 1 instructs the ISDN interface circuit 14 to disconnect the information channel (step 211), and returns to the waiting state.

When the result in step 203 is NO, the system controller 1 checks whether the information transfer ability included in the received call set-up message SETUP indicates a 3.1 audio signal with a bit rate of 64 kbps (step 213 shown in FIG. 7B). When the result in step 213 is YES, the system controller 1 checks whether the low-level layer matching information element is included in the received call set-up message SETUP (step 214). When the result in step 204 is YES, the system controller 1 discerns whether the contents of the low-level layer matching information element coincide with those of the own low-level layer matching information stored in the parameter memory 2 (step 215). When the result in step 215 is affirmative, the system controller 1 discerns whether the high-level layer matching information element is included in the received call set-up message SETUP (step 216). When the result in step 216 is YES, the system controller 1 checks whether the contents of the high-level layer matching information coincide with those of the own high-level layer matching stored in the parameter memory 2 (step 217). When the result in step 217 is YES, the destination terminal sends the ISDN the answer message CONN (step 218), and then checks whether the answer confirmation message CONN ACK is received within a predetermined fixed time from the completion of sending the answer message CONN (a NO loop related to steps 219 and 220).

When the result in step 209 is YES, the system controller 1 instructs the switch 15 to select the A/D converter 11 and the D/A converter 12 so that the ISDN interface circuit 14 is switched so as to be connected to the A/D converter 11 and the D/A converter 12 from the G4 communication controller 13. At the same time, the system controller 1 instructs the switch 16 to select the modem 9 so that the facsimile machine is switched to the group 3 mode, and activates the G3 communication controller 8 so as to start the group 3 facsimile transmission control procedure (step 221). On the other hand, when the result in step 220 is YES, the the system controller 1 instructs the ISDN interface circuit 14 to disconnect the information channel (step 222) and is switched to the waiting state.

On the other hand, the call-in is neglected, when the contents of the low-level layer matching information element do not coincide with those of the own low-level layer matching information and therefore the result in step 215 is NO, or when the contents of the high-level layer matching information element do not coincide with those of the own high-level layer matching information and therefore the result in step 217 is NO (step 223).

When the call set-up message SETUP includes the progress identifier information element and therefore the result at step 202 is YES, the system controller 1 determines whether the contents of the progress identifier information element indicates that the source terminal is a non-ISDN terminal (step 224). When the result in step 224 (FIG. 7A) is YES, the system controller 1 sends the ISDN the answer message CONN (step 218). When the result in step 224 is NO, the procedure proceeds to step 203.

In the above-mentioned manner, when the destination terminal receives the call set-up message SETUP, it discriminates the transmission functions to be used on the basis of the contents of the information elements contained in the received call set-up message SETUP. When it is determined that it is impossible to process the call-in, the destination terminal neglects it and provides no answer.

In the above-mentioned embodiment, the transmission functions available in the other terminal is discriminated at the time of setting up a call or a receiving a call, and it is possible to select either the group 3 facsimile function or the group 4 facsimile function, depending on the discrimination results. As a result, there is no need for a specific operation by an operator, such as setting of the desired transmission function.

In the call release procedure carried out when the data transfer is completed, the ISDN lets either the release message REL or disconnect message DISC include the fee information. The system controller 1 controls the operation/display unit 5 so as to display fee information supplied from the ISDN on the liquid crystal pannel 5g at the time when the own terminal request to set up a call or data transfer is completed. Additionally, the system controller 1 controls the parameter memory 2 so as to sequentially store the fee information together with date information in a fee information area (not shown) formed therein. The system controller 1 includes a timer function which provides information on present date and time.

When the operator operates the fee key 5f (FIG. 2), the system controller 1 controls the liquid crystal display pannel 5g of the operation/display unit 5 so as to display a guidance message for inputting a period related to fee information to be displayed thereon. Then the system controller 1 switches the input mode of the ten key 5c to the date input mode. Thereafter, when the operator inputs the beginning date and final date through the ten key 5c, the system controller 1 reads all fee information related to the designated period from the parameter memory 2, and then calculates the sum total of the read fees. Then the system controller 1 controls the operation/display unit 5 so as to display the calculated sum total on the liquid crystal display pannel 5g. The system controller 1 switches the input mode of the ten key 5c to the numeric data input mode from the date input mode. In the above-mentioned manner, the fees related to the designated period are displayed on the liquid crystal display pannel 5g.

It is possible to let menu display for indicating guidance messages have an item of "report output". When this is selected, the system controller 1 controls the plotter 4 so as to output a printed report which indicates the fees related to the designated period.

When a plurality of sections use a single present facsimile machine in common, the following may be used. That is, the system controller 1 calculates fees related to the respective sections, and controls the operation/display unit 5 and/or the plotter 4 so as to display and/or print the individual fees. It is noted that fee information supplied from the ISDN indicates precise fees and therefore precise fee management can be done.

The above-mentioned embodiment can be applied to not only facsimile machines but also another data terminal equipment such as a digital telephone set.

The present invention is not limited to the aforementioned embodiments, and variations and modifications may be made without departing from the scope of the invention.

What is claimed is:

1. A method for controlling a terminal equipment coupled to an intergrated services digital network (ISDN) through a single communication line, comprising the steps of:
   discerning whether a message supplied from said ISDN is received, said message being used at the time of setting up a call;
   determining, each time said message is received, as to whether or not said message includes information indicating whether a different terminal equipment which said terminal equipment communicates with is a terminal coupled to either an ISDN or an analog network other than said ISDN, said analog network being coupled to said ISDN;
   determining whether the different terminal equipment is a terminal coupled to said ISDN or said analog network other than the ISDN by referring to said information included in said message;
   executing a first communication control suitable for exchanging data with the different terminal equipment through said ISDN, when the different terminal equipment is determined to be a terminal coupled to said ISDN by referring to said information in said message; and
   executing a second communication control suitable for exchanging data with the different terminal equipment through said ISDN and said analog network connected thereto, when the different terminal equipment is determined to be a terminal coupled to said analog network other than said ISDN by referring to said information included in said message.

2. A method for controlling a terminal equipment as claimed in claim 1, wherein when said terminal equipment serves as a source terminal, said message includes a call set-up accepted message indicating that a call set-up message from said source terminal is accepted by the different terminal equipment serving as a destination terminal, a call message indicating that said destination terminal is being called, and an answer message indicating that said destination terminal answers said call set-up message.

3. A method for controlling a terminal equipment as claimed in claim 1, wherein when said terminal equipment serves as a destination terminal, said message includes a call set-up message received from the different terminal equipment serving as a source terminal, and an answer confirmation message supplied from said source terminal in response to an answer message sent by said destination terminal.

4. A method for controlling a terminal equipment as claimed in claim 1, wherein when all the messages used during the time when a call is set up, do not have said information, the different terminal equipment is determined to be a terminal coupled to the ISDN, and said first communication control is executed.

5. A method for controlling a terminal equipment as claimed in claim 1, wherein any one of said messages used during the time when a call is set-up, has said information, the different terminal equipment is determined to be a terminal coupled to said analog network, and said second communication control is executed.

6. A method for controlling a terminal equipment as claimed in claim 1, wherein said first communication control conforms to a group 4 facsimile procedure as prescribed by CCITT recommendations.

7. A method for controlling a terminal equipment as claimed in claim 1, wherein said second communication control conforms to a group 3 facsimile procedure as prescribed by CCITT recommendations.

8. A method for controlling a terminal equipment as claimed in claim 1, wherein said steps of discerning whether a message is received and determining whether said message includes information are repetitively carried out during a predetermined fixed time.

9. A terminal equipment coupled, through a single communication line, to an integrated services digital network (ISDN) handling data in digital form, comprising:
   ISDN interface means, coupled to said ISDN, for executing a transmission control procedure related to up to layer 3 of an ISDN structured architecture.
   discerning means for discerning whether a message supplied from said ISDN is received through said ISDN interface means, said message being used at the time of setting up a call;
   first determining means, operatively coupled to said discerning means, for determining, each time said message is received, as to whether or not said message includes information on whether a different terminal equipment which said terminal equipment communicates with is a terminal coupled to either an ISDN or an analog network other than said ISDN, said analog network being coupled to said ISDN;
   second determining means, operatively coupled to said first determining means, for determining whether the different terminal equipment is a terminal coupled to said ISDN or said analog network other than the ISDN;
   first control means, coupled to said second determining means, for executing a first communication control suitable for exchanging data with the different terminal equipment through said ISDN, when the different terminal equipment is determined to be a terminal coupled to the ISDN by referring to said information included in said message;
   second control means, coupled to said second determining means, for executing a second communication control suitable for exchanging data with the different terminal equipment through said ISDN and said analog network connected thereto, when the different terminal equipment is determined to be a terminal coupled to said analog network other than said ISDN by referring to said information included in said message; and
   switching means for selectively connecting one of said first control means and second control means to said ISDN interface means, said switching means being controlled based on the determination result in said second determining means.

10. A terminal equipment as claimed in claim 9, wherein normally, said switching means selects said first control means.

11. A terminal equipment as claimed in claim 9, wherein normally, said switching means selects said first control means, and selects said second control means when the different terminal equipment is determined to be a terminal coupled to said analog network other than said ISDN by said second determining means.

12. A terminal equipment as claimed in claim 9, wherein said first communication control conforms to a transport layer, a session layer, a presentation layer and an application layer of said ISDN structured architecture for a group 4 facsimile machine as prescribed by CCITT recommendations.

13. A terminal equipment as claimed in claim 9, wherein said second control means handles data in analog form and includes converting means for converting said data in analog form into data in digital form which is sent to said ISDN through said switching means and said ISDN interface means and for converting data in digital form supplied from said ISDN through said ISDN interface means and said switching means into data in analog form.

14. A terminal equipment as claimed in claim 9, wherein when said terminal equipment serves as a source terminal, said message includes a call set-up accepted message indicating that a call set-up message from said source terminal is accepted by the different terminal equipment serving as a destination terminal, a call message indicating that said destination terminal is being called, and an answer message indicating that said destination terminal answers said call set-up message.

15. A terminal equipment as claimed in claim 9, wherein when said terminal equipment serves as a destination terminal, said message includes a call set-up message received from the different terminal serving as a source terminal, and an answer confirmation message supplied from said source terminal in response to an answer message sent by said destination terminal.

16. A terminal equipment as claimed in claim 9, wherein when all the messages used during the time when a call is set up, do not have said information, the different terminal equipment is determined, by said second determining means, to be a terminal coupled to the ISDN, and said switching means selects said first control means.

17. A terminal equipment as claimed in claim 9, wherein any one of said messages used during the time when a call is set-up, has said information, the different terminal equipment is determined, by said second determining means, to be a terminal coupled to said analog network and said switching means selects said second control means.

18. A terminal equipment as claimed in claim 9, wherein said first communication control conforms to a group 4 facsimile procedure as prescribed by CCITT recommendations.

19. A terminal equipment as claimed in claim 9, wherein said second communication control conforms to a group 3 facsimile procedure as prescribed in CCITT recommendations.

20. A terminal equipment as claimed in claim 9, wherein said discerning means and said first determining means operate during a predetermined fixed time.

21. A terminal equipment as claimed in claim 9, further comprising storing means for storing fee information supplied from said ISDN, calculating means for calculating the sum total of fees from said fee information, and output means for outputting said calculated sum total to an operator.

22. A terminal equipment as claimed in claim 21, further comprising input means for inputting a period desired to calculate the sum total of fees, wherein said calculating means calculates the sum total of fees related to said input period.

* * * * *